FIG. 2.

INVENTOR:
Edwin F. Saxman, Jr.,
BY Paul & Paul
ATTORNEYS.

Patented May 22, 1951

2,553,983

UNITED STATES PATENT OFFICE 2,553,983

AUTOMATIC FLIGHT CONTROL AND APPROACH AND LANDING SYSTEM FOR AIRCRAFT

Edwin F. Saxman, Jr., Gladwyne, Pa.

Application August 9, 1947, Serial No. 767,688

16 Claims. (Cl. 244—77)

The present invention relates broadly to flight control of aircraft and to an approach and landing system therefor and particularly to the continuous automatic control of aircraft both as a part of flight control and in approaches for landings. Within the broad field of aircraft approach and landing the present invention includes means for the control of the position of an aircraft in a vertical direction relative to an externally generated beam or glide path from a position relatively remote from the airport until contact is made with the runway and a process for holding an airplane on such glide path.

Various methods have hitherto been proposed for accomplishing the safe landing of aircraft under restricted conditions of ceiling and visibility. All such systems must take into account the fact that the pilot during some or all of the approach and landing procedure lacks visual contact with the ground and must therefore substitute some other means for the normal visual reference in making such approaches and landings. One of the oldest of such systems, and one still widely in use, involves the employment of a corrected sensitive altimeter to give an indication of altitude above the landing field and the use of a radio beam to give a directional line of reference leading to a point near the airfield. Using this system, the pilot maintains his position along the radio directional beam and gradually reduces altitude to a predetermined figure over a known point along the directional beam. After crossing this point additional altitude is lost at a predetermined rate for a predetermined time so calculated as to bring the airplane over the desired landing field at a safe minimum altitude. The pilot then lands the airplane by visual reference to the ground if he has broken out of the overcast and can see the ground, or, if visual ground contact has not been made, he immediately ascends to a safe altitude and repeats the procedure. This system is subject to a number of disadvantages and serious limitations. In addition to being time consuming and difficult under adverse conditions, the system described above cannot be used under conditions of very low ceiling and visibility. The reason for this lies in the fact that the final stages of the approach and the actual landing must be made with the pilot having visual contact with the ground for an appreciable time prior to making contact with the runway. At most airports the minimum safe altitude for establishing visual contact is between 300 and 400 feet. Consequently this system cannot be safely used when the ceiling is lower than such minimum safe altitude. An added disadvantage arising from the use of this system is the time consumed and the general delay which results from the congestion caused when one or more approaches are missed by incoming aircraft. The time required for each individual approach is such that the total waiting time for the last ship in the "stack" may be as long as three hours. This is obviously impractical, inefficient and hazardous.

In view of the difficulties referred to above, other systems have been proposed for guiding aircraft to safe landings under conditions of low ceiling and visibility. One such system was developed by the armed forces during the late war and involves the use of radar to guide the pilot to a safe landing by radio instructions issued by operators stationed on the ground. This is the so called Ground Control Approach System known as GCA. While this system can be used successfully under conditions which would prohibit the use of the earlier instrument system described above, it is still subject to serious disadvantages which are inherent in this type of system. Not the least of these disadvantages is the fact that the system cannot be made to operate automatically since it is dependent on the following by the pilot of radio instructions which he receives orally from the ground. There is also the difficulty of absolute certainty of identification of the aircraft being controlled, particularly under conditions where several airplanes are in the same general vicinity. It is also dependent on the pilot doing exactly what he is told to do.

Still a third system which has been proposed involves the use of a radio beam or glide path which is projected from the airport at a predetermined angle to the horizontal and a directional or localizer beam projected in a vertical plane. Various systems have been proposed for automatically maintaining aircraft on such a glide path. One such system involves using the elevators to bring the aircraft back to such glide path on vertical displacements therefrom. This system has not been successful under all conditions because a minimum air speed must be continuously maintained in order to avoid stalling the airplane. This is usually accomplished by attempting to maintain a constant air speed which must be calculated because of the varying weight of the aircraft. The principal difficulties inherent in such a system, aside from the troublesome calculations required, are that the minimum air speed which must be maintained is necessarily excessive as of the time of actual landing, and the action of bringing about a nose-down condition in order to follow the glide path is fundamentally dangerous when the aircraft is at low altitudes since a dip in the glide path will result in a nose-down condition when the airplane is too near the ground to permit recovery. Moreover, for high wing loadings the minimum air speed becomes too high to be practical since the minimum speed must take into account the necessity of making turns.

The present invention is directed to overcoming the difficulties of the systems referred to above and, as will be seen from the description which follows, operates on a principle entirely different from any other system heretofore proposed.

In addition to the above, the present invention is also directed to providing means for accomplishing control of aircraft while in flight. With the means now available in the art, it is not possible to establish and continuously maintain a desired angle of attack, although it is recognized that to obtain maximum range an airplane should be flown at a certain constant angle of attack and that likewise maximum endurance in the air and maximum efficiency can be obtained only by maintaining predetermined angles of attack. This problem is complicated by the fact that attitude and/or power requirements for maintaining a given altitude at a constant angle of attack are continuously variable as the load decreases or increases and in normal operation there is a continuous decrease in load as fuel is consumed. The present invention provides means for selecting a desired angle of attack and also means for manually or automatically maintaining flight at the desired angle of attack independently of changes in load or attitude.

Therefore, one object of the present invention is to provide a combined flight control and approach and landing system for aircraft.

A further object of the present invention is to provide an approach and landing system for bringing an airplane to a safe landing under conditions of restricted ceiling and visibility.

A further object of the present invention is to provide an automatic approach and landing system which is inherently stall proof.

A still further object of the present invention is to provide a system for flight control designed to maintain automatically any desired safe angle of attack.

A still further object is to provide means and process for manually controlling an airplane to maintain its position on an externally generated glide path.

In the description of the present invention which follows, reference will be made to the accompanying drawings in which.

In the following description of the present invention the term "angle of attack" will occur frequently. In the past there has been some difference in terminology as between the United States and other countries such as Great Britain with respect to this term and it is therefore here defined in the sense in which it will be used throughout this specification and the appended claims. Where so used, "angle of attack" is intended to mean the angle between the chord of the wing of the aircraft in question and the direction of the relative wind in a plane perpendicular to the lateral axis of said wing.

In describing the present invention the approach and landing systems will be first described and the flight control system will be separately described at a later point in the present specification. It is to be noted that both systems employ the same general means although in a different way. The outstanding difference between the two is that the approach and landing system involves controlled changes in angle of attack at constant attitudes whereas the flight control system operates to change the attitude while holding a constant angle of attack.

The approach and landing system is designed to operate in conjunction with a glide path beam and a localizer beam generated at the landing area in ways well known to the art. One such system which may be used is designated as the SCS-51, or ILS, system, the transmitting components of which are manufactured by Federal Radio Laboratories, Inc. It consists essentially of a glide path transmitter designed to propagate a high frequency glide path beam of limited vertical dimensions inclined upwardly from the landing area at a predetermined angle from the horizontal, and a localizer transmitter designed to transmit a directional beam at a much lower frequency in a vertical directional beam of limited lateral dimensions. The desired track in space for the airplane approaching for a landing is the intersection of the inclined glide path beam and the vertical localizer beam. All points removed from such intersection have signal characteristics which differ from the intersection characteristics. While the above described system is suitable for use in connection wtih the present invention, it will be understood that other systems may be used. The present invention is directed in its approach and landing aspect primarily to maintaining the aircraft on the desired track and is independent of the method used for establishing such track except for the provision of means responsive to the elements thereof.

It is also possible to use the present invention on other types of ranges including controlled omni-directional ranges in which case the lateral connection may be handled in a number of ways including the use of electronic computers.

Figures 1, 4:
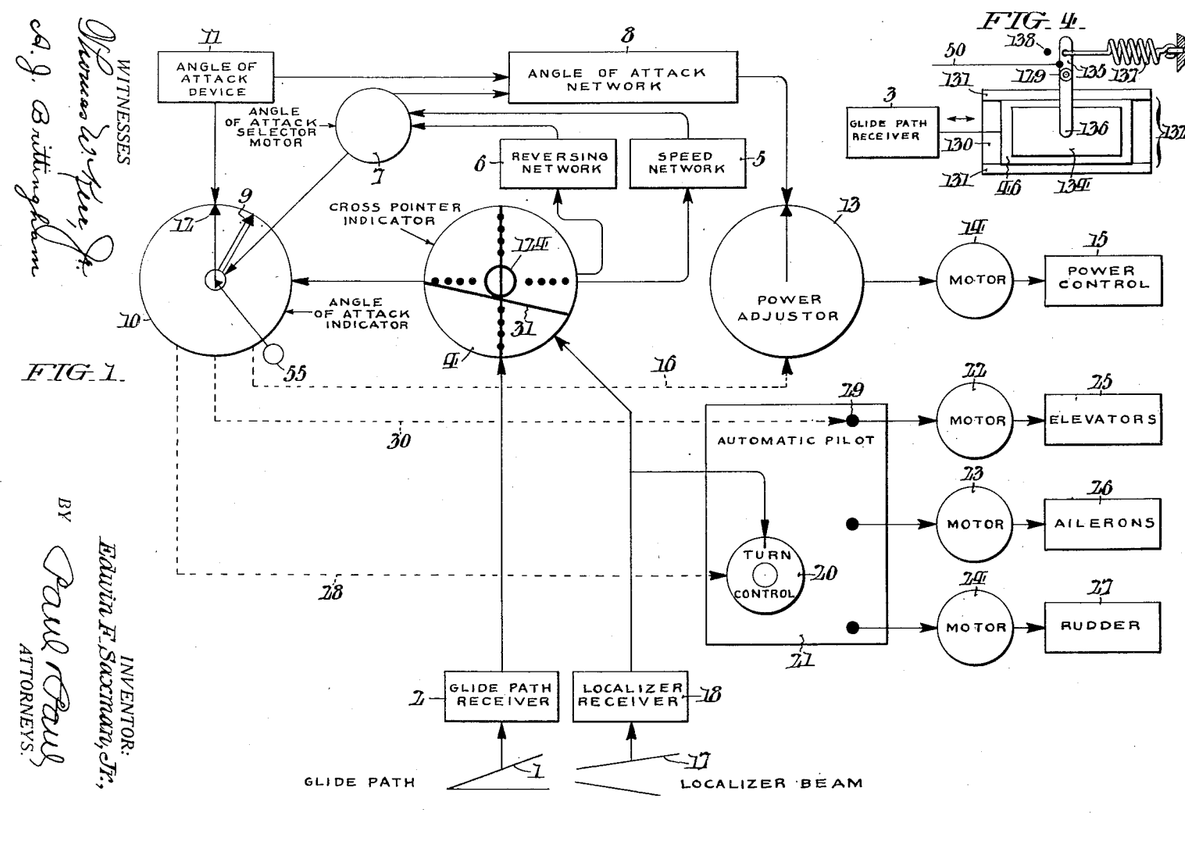
Fig. 1 represents diagrammatically the essential controlled aircraft elements and the controlling means of the present invention.
Fig. 4 is a diagrammatic showing of the reversing mechanism of circuit 6.

In Fig. 1 of the drawings, a glide path generated as described above is shown diagrammatically at 1 and a glide path receiver adapted to being tuned to the frequency of glide path 1 is indicated at 2. Glide path receiver 2, together with the rest of the equipment hereinafter described, is carried aloft by the airplane. It consists of a standard and well known glide path receiver manufactured by Federal Radio Laboratories, Inc., under the designation AN/ARN-5. Its function is the reception of the glide path signal and the production of an output signal which is continuously and automatically varied upon departures of the aircraft in either an up or down direction relative to the glide path. This variable output from receiver 2 actuates the horizontal needle 31 of the cross pointer indicator 4 which is a standard instrument normally used in conjunction with the AN/ARN-5 receiver.

The horizontal needle 31 of indicator 4, operating through speed network 5 and reversing network 6, brings about changes in the operation of angle of attack selector motor 7. These changes at angle of attack selector 7 result in changes in angle of attack network 8 and in the position of needle 12 of angle of attack indicator 10. Changes are also made in angle of attack network 8 in response to movements of angle of attack device 11 which movements are also used to produce changes in the position of needle 9 of indicator 10. Power adjustor 13 operates in response to the output from angle of attack network 8 and brings about control of the operation of reversible motor 14 which in turn makes adjustments through power control 15 to vary the power output derived from the power plant of the airplane. One way of accomplishing such power changes is through adjustments of the throttle settings. As hereinafter described, power adjustor 13 is also operated to increase the power output from the power plant when the angle of attack of the airplane as measured by device 11 and needle 9 reaches a predetermined critical value. This action to increase power at a predetermined critical angle of attack is shown diagrammatically by dotted line 16.

In Fig. 1 there is also a diagrammatic showing of a localizer beam 17 and elements responsive thereto for maintaining the airplane on the localizer beam. This is accomplished by the action of localizer receiver 18, the output of which actuates the vertical needle of indicator 4. It also is used to adjust the turn control mechanism 20 of automatic pilot 21 in order to hold the airplane on the localizer beam. The localizer receiver 18 may be the standard well known RC-103-A manufactured by Federal Radio Laboratories, Inc. Automatic pilot 21 may be the well known auto-pilot manufactured by Minneapolis-Honeywell Regulator and Control Company. In addition to its other functions it may be used to establish and maintain a desired attitude through the action of the dive control mechanism forming a part thereof. Such desired attitude may be maintained independently of changes in other variables such as the throttle settings. Automatic pilot 21 operates in a well known manner through motors 22, 23 and 24 to control elevators 25, ailerons 26 and rudder 27 respectively. The above described system for maintaining an airplane on a localizer beam is well known in the art and its construction and use is therefore merely shown diagrammatically in the drawings. In addition to receiving impulses from localizer receiver 18, turn control 20 of automatic pilot 21 is also connected to the output from angle of attack device 11 through indicator 10 in such a way as to bring about a decrease in the rate of turn or to stop all turn at a predetermined critical angle of attack. This action is shown diagrammatically by dotted line 28 in Fig. 1. Likewise the dive-climb control 29 of automatic pilot 21 is connected to the output of angle of attack device 11 through indicator 10 in such a way as to depress elevators 25 in the event a predetermined critical angle of attack is reached when the airplane is in straight flight. This connection is shown diagrammatically by dotted line 30 in Fig. 1.

Figure 2:
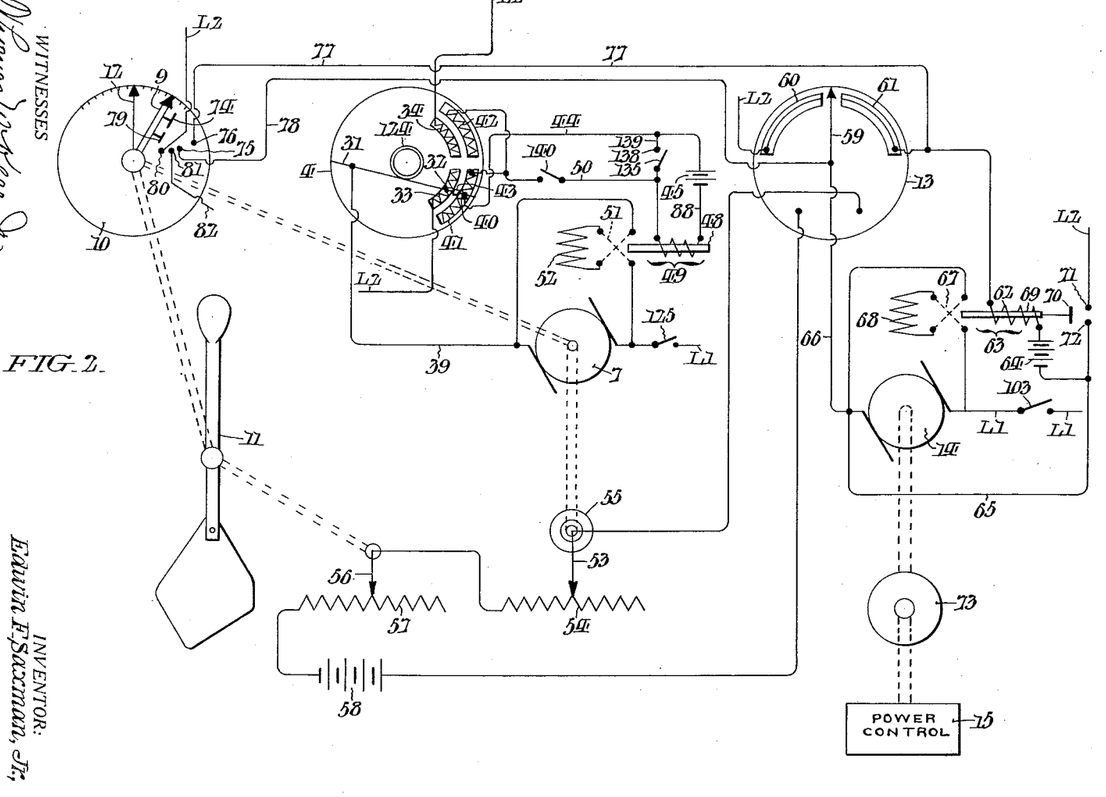
Fig. 2 is a more detailed showing of the elements of the invention shown in Fig. 1.

In Fig. 2 the operative relationships between the various elements shown in Fig. 1 are represented in more detail, although it will be understood by those skilled in the art that other means for bringing about the desired effects may be substituted for those shown. The horizontal pointer 31 of cross pointer indicator 4 is shown as carrying a contact point 32 which slides along variable resistances 33 and 34 which are connected to one side of the line at L2. Pointer 31 is connected to one side of angle of attack selector motor 7 through line 39. Therefore, the speed of motor 7 is varied with changes in the total resistance of that part of network 5 which is momentarily in circuit between L2 and motor 7. The result is that motor 7 operates at faster speeds as the aircraft departs further from the glide path. At the horizontal position of pointer 31, motor 7 is inoperative. A second contact point 40 is carried by pointer 31 and this contact point engages variable resistance 41 when pointer 31 is in the down position. Contact 40 engages variable resistance 42 when pointer 31 is in the up position. Contact point 40 is electrically insulated from contact point 32 and the main portion of pointer 31 by insulation 43. Through line 44 contact point 40 is connected to one side of battery 45 and to line 50 through switch 135. The other side of battery 45 is connected to one side of the coil 48 of solenoid 49. The other side of coil 48 is connected to resistances 41 and 42 through switch 140, line 50 and thence to point 40. Solenoid 49 operates reversing switch 51 which is connected to shunt winding 52 of reversible motor 7. The other side of reversible motor 7 is connected to the line at L1 through switch 125.

Figure 3:
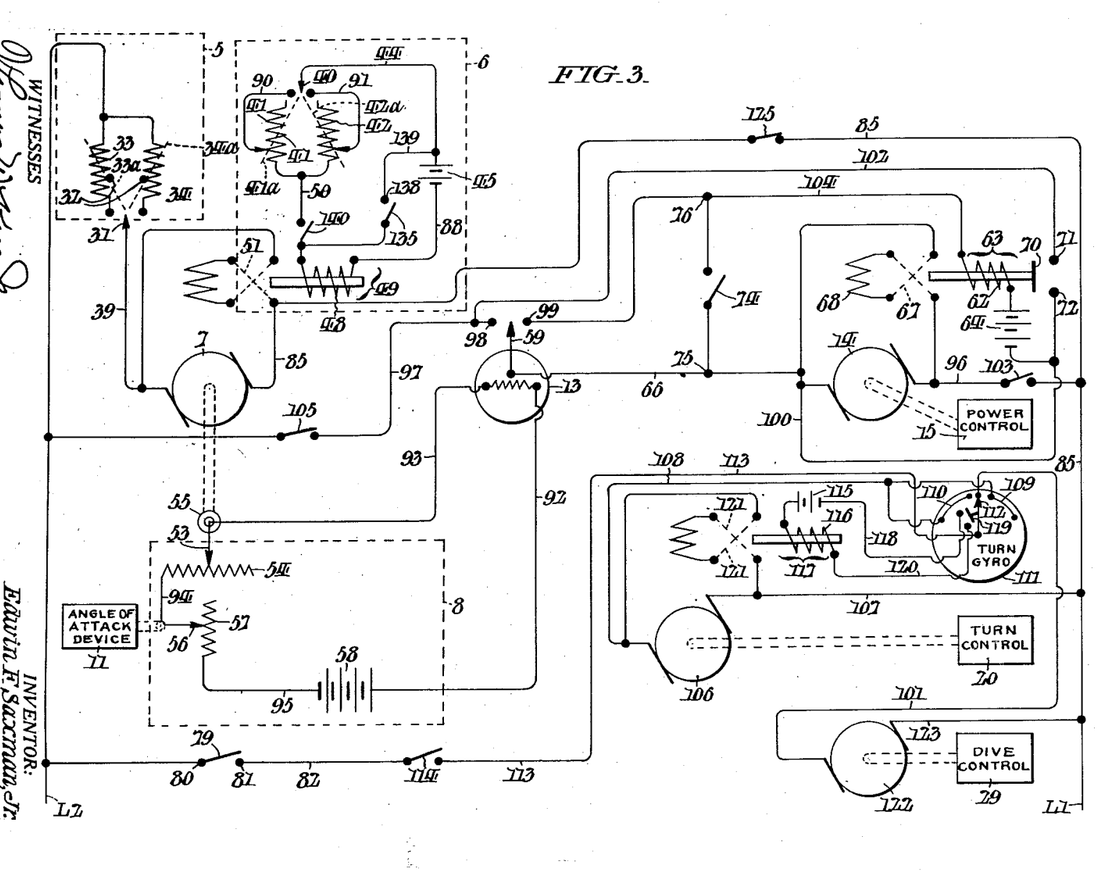
Fig. 3 is a circuit diagram of the elements shown in Fig. 1 and Fig. 2 and an alarm system connected thereto.

Angle of attack selector motor 7 is mechanically connected to the movable arm 53 of variable resistance 54. Movable arm 53 is also adjustable manually independent of the action of motor 7 through manual angle of attack selector 55. Movable arm 56 of variable resistance 57 is mechanically connected to angle of attack device 11 and is responsive to movements thereof. Angle of attack device 11 is also shown as mechanically connected to angle of attack indicator 10 to actuate pointer 9. This connection operates pointer 9 in such a way as to indicate the actual angle of attack of the airplane. Motor 7 is shown as mechanically connected to pointer 12 of indicator 10. Therefore changes in the position of pointer 12 reflect changes in the requested angle of attack established by motor 7. Variable resistances 54 and 57 are connected in series with battery 58. This network, comprising angle of attack network 8 of Figs. 1 and 3 is connected to milliammeter 13 which corresponds to power adjustor 13 as shown in Fig. 1. Needle 59 of milliammeter 13 is connected directly to one side of motor 14. The other side of motor 14 is connected through switch 103 to one side of the line at L1 as shown. Sector 60 is mounted to the left of needle 59 and is connected to the other side of the line at L2 as shown. Sector 61 is mounted to the right of needle 59 and is connected to one side of coil 62 of solenoid 63. The other side of coil 62 is connected to the battery 64 and the other side of battery 64 is connected to needle 59 through lines 65 and 66. Solenoid 63 is provided for operating reversing switch 67 which is connected to the shunt winding 68 of reversible motor 14. The movable element 69 of solenoid 63 carries a contact member 70 which is provided for making contact between points 71 and 72 in line L2 when solenoid 63 is energized and which breaks contact between points 71 and 72 when solenoid 62 is deenergized. Motor 14 is mechanically connected to power control 15 through manual power control means 73 which is operative independently of the action of motor 14. An alarm switch 74 is shown as a part of angle of attack indicator 10 and acts to close contacts 75 and 76 when arm 9 on which it is mounted reaches a predetermined critical value for the angle of attack. This has the effect of energizing solenoid 63 through the connection of lines 77 and 78 of Fig. 2 and lines 100 and 104 of Fig. 3. The result is an immediate increase of power at power control 15 and a consequent decrease in angle of attack. A second alarm switch is provided at 79 which operates to connect points 80 and 81 of Fig. 2 when pointer 9 reaches a predetermined critical value of angle of attack. Point 80 is connected to the L2 side of the line and point 81 is connected to the movable pointer 112 of turn gyro 111 through point 82, switch 114 and line 113 as indicated in Fig. 3.

Fig. 3 comprises the electrical circuits involved in the operation of the elements shown in Figs. 1 and 2 and in addition includes the electrical circuits for alarm means designed to automatically bring about the proper changes in the controls of the airplane when a predetermined dangerous angle of attack is reached. In Fig. 3 the two sides of the main power line are shown at L1 and L2. In order to aid in the understanding of the description of the operation of the present invention which follows, the various circuits involved in Fig. 3 will now be traced. Starting with speed network 5, resistance elements 33 and 34 are connected to the L2 side of the line. The speed network circuit may then be followed through resistance 33 to the movable contact point 32. From resistance 33 the circuit flows through pointer 31 when pointer 31 is in the down position in Fig. 2 which corresponds to a swing to the left in Fig. 3. The circuit then goes through line 39 to the left side of motor 7. The other side of motor 7 is connected to the L1 side of the line through the line 85 when switch 125 is in its normally closed position. Similarly, when needle 31 takes the right hand position, the circuit passes from L2 through resistance 34 to contact point 32 and thence through pointer 31 and line 39 to the left side of motor 7. Dotted lines 33a and 34a are intended to represent a variation in the position of contact point 32 along resistances 33 and 34 respectively responsive to movements of pointer 31 as shown diagrammatically in Fig. 2.

Reversing network 6 is independent of the main power line and has a separate current source consisting of battery 45. One side of battery 45 is connected to coil 48 of solenoid 49 through line 83. The other side of battery 45 is connected to the other side of coil 48 through line 44 to the point 40 which is carried by pointer 31 of Fig. 2. When pointer 31 is in the down position, corresponding to a swing to the left in Fig. 3, contact is made with line 90 and the circuit therefore flows through variable resistance 41 and thence through line 50 and switch 140 to the other side of coil 48. When pointer 31 is in the up position, contact point 40 moves to the right and the circuit flows through line 91 and thence through resistance 42, line 50 and switch 140 to the coil 48 of solenoid 49. Dotted lines 41a and 42a are intended to represent a variation in the position of contact point 40 along resistances 41 and 42 respectively responsive to movements of pointer 31. Switch 135 is provided connecting battery 45 with coil 48 through lines 139 and 50.

Solenoid 49 is either energized or deenergized depending upon the total resistance established between the battery 45 and line 50 and the action of switches 135 and 140. The action of solenoid 49 is such as to throw reversing switch 51 in one direction on energization and in the opposite direction on deenergization. This results in a reversing of the direction of rotation of motor 7 with a consequent change in requested angle of attack.

Upon rapid changes in position of the aircraft relative to the glide path it is desirable to provide means for changing the direction of rotation of motor 7 prior to the time when the aircraft returns to the glide path. By thus changing the requested angle of attack before the inertia of the aircraft carries it beyond the glide path, a smoother operation is obtained than would otherwise be the case. This may be accomplished in a number of ways. One device for accomplishing this is illustrated in Fig. 4 in which there is shown a slide member 46 which is operated by a mechanical connection to the glide path coupler 3. Connections of this sort are known to the art and need not be described here. Slide 46 is guided in slot 130 formed by flange members 131. Channel 132 may be suitably lubricated to provide ease of operation. Mounted in slide 46 is an insert 134 constructed of "Silinite." Arm 135 which consists of a flat spring carries a contact element 136 which rides on the surface of "Silinite" body 134 with a pressure of about one ounce maintained by spring 135. "Silinite" is a well-known combination lubricant and resistance composition made by Watson Stabilator Company of Philadelphia, Pennsylvania. Pivot support 129 is provided for spring 135. Spring 137 is attached to arm 135 and holds it in a normally open position with respect to contact 138 which is connected through line 139 to one side of the battery 45. A similar slide, not shown, is used to operate switch 140 except that this switch is held in a normally closed position by a similar spring arrangement. The "Silinite" bar 134 has the characteristic of offering greater resistence to travel when it is moving fast relative to the contact element 136 than when moving slowly. Consequently, on a rapid motion of slide 46 to the right in response to a rapid downward motion of the airplane toward the glide path the contact end of arm 135 is moved to the left and makes contact with point 138. Since arm 135 is connected to one side of the solenoid coil 48 the resultant contact energizes solenoid 49 and operates reversing switch 51. The result is that motor 7 is rotated in a direction calling for less increase in requested angle of attack. Similarly, a rapid motion to the left of the slide operating switch 140 when the aircraft moves rapidly upward toward the glide path results in an opening of switch 140 and this brings about a reversal of motor 7 through the deenergization of solenoid 49. This results in a rotation of motor 7 in a direction calling for less decrease in angle of attack.

Angle of attack network 8 is also independent of the line and has a separate source of current comprising battery 58. One side of battery 58 is connected through line 92 to one of the terminals of milliammeter 13. The other terminal of milliammeter 13 is connected to resistance 54 through line 93 and movable arm 53. The circuit is then completed through line 94, movable arm 56, variable resistance 57 and line 95 to the other side of battery 58. Variations in the effective resistance at 54 and 57 are made through the action of motor 7 and movements of angle of attack device 11 respectively.

The circuits for operating reversible motor 14 will now be described. One side of motor 14 is connected directly to the L1 side of the line through line 96 and switch 103. The other side of motor 14 is connected to the L2 side of the line through pointer 59, line 97 and switch 105. This connection is made when pointer 59, swings to the left to make contact with point 98 which lies on segment 60 of Fig. 2. When pointer 59 is in the right hand position making contact with point 99 which lies on segment 61 of Fig. 2, the left hand side of motor 14 is connected to the L2 side of the line through line 100, switch 70, line 102, line 97 and switch 105. Switch 70 is closed when pointer 59 is in the right hand position in response to the action of solenoid 63 which is operated through a circuit independent of the line and having a battery source 64 connected directly to one end of solenoid coil 62. The other end of coil 62 is connected to the other side of the battery 64 through line 104, point 99, pointer 59, line 66 and line 100 when pointer 59 is in the right hand position. When pointer 59 is out of contact with point 99 and switch 74 is in its normally open position, coil 62 is not connected to both sides of battery 64 and solenoid 63 is therefore deenergized. In this position the circuit between points 71 and 72 is broken. Reversing switch 67 is operated in response to energization and deenergization of solenoid 63. This operation results in a reversing of the direction of rotation of motor 14 by reversal of connections to shunt winding 68. Landing switch 105 is normally closed but is opened when the airplane make contact with the ground. Means for mounting and operating such a switch on landing are shown in my U. S. Patent #2,193,077 and therefore are not shown in the present application. Switch 74 is adapted to close the circuit between points 75 and 76 when a predetermined critical angle of attack is indicated by pointer 9 of Fig. 2. This results in energizing solenoid 63 since one side of coil 62 is thereby connected to one side of battery 64 through line 104, point 76, switch 74, point 75 and line 100. The other side of coil 62 is permanently connected to the other side of battery 64. When 63 is thus energized, motor 14 is caused to run in a direction to increase power through power control 15 provided landing switch 105 is in its normally closed position. Switch 103 is provided for completely disconnecting motor 14 from the L1 side of the line.

Turn control motor 106 is connected to the L1 side of the line through lines 107 and 85. The other side of motor 106 is connected through line 108 to segment 109 and segment 110 of turn gyro 111. When the pointer 112 of turn gyro 111 moves either to the left or to the right, contact is made to the L2 side of the line through line 113 provided switch 79 is closed and provided also that landing switch 114 is in its normally closed position. Landing switch 114 operates in the same way as landing switch 105. Switch 79 is closed only when pointer 9 of angle of attack indicator 10 reaches a predetermined critical value. The reversing circuit for motor 106 has a separate source of current comprising battery 115, one side of which is connected to one side of coil 116 of solenoid 117. The other side of battery 115 is connected to the other side of coil 116 through line 118, switch 119 and line 120. Switch 119 is closed when pointer 112 swings to the left and is open when pointer 112 is centered or swings to the right. Energization of solenoid 117 operates reversing switch 121 and results in a change in the direction of rotation of motor 106 during the periods when motor 106 is operative which will be only when pointer 112 is positioned either to the right or left of center at a time when switches 79 and 114 are both closed. Operation of motor 106 causes neutralizing changes in the position of turn control 20 which forms a part of automatic pilot 21 shown in Fig. 1.

Dive control motor 122 is directly connected to the L1 side of the line through lines 123 and 85. The other side of motor 122 is connected to the L2 side of the line through line 101, pointer 112 and line 113 but this connection is made only when pointer 112 is centered and when switches 79 and 114 are both closed. This occurs only when the aircraft is in straight flight and at an angle of attack in excess of a predetermined critical angle. Operation of motor 122 brings about changes in the dive control element 29 of automatic pilot 21 shown in Fig. 1. Turn gyro 111 is a standard instrument which operates in such a way as to center pointer 112 when the airplane is in straight flight and to swing pointer 112 either to the left or to the right when the airplane is turning.

Having described means embodying my invention, I will now describe the operation of such means in carrying out the objects of my invention. This description divides itself logically into two sections, the first having to do with the use of my invention as an approach and landing system, and the second having to do with the use of my invention in carrying out flight control. These will be separately discussed in the order mentioned.

The operation of holding the airplane on the localizer beam is well known in the art and therefore requires no further description. It is sufficient to state that the necessary coordinated turns to hold the localizer beam are made automatically by the automatic pilot 21 in response to the signals coming from localizer receiver 18. The operation of the present invention to automatically put the airplane on the glide path and hold it there is not known to the art and will therefore be described in detail.

The output from glide path receiver 2 operates cross pointer indicator 4 and, in a way known to the art, the horizontal pointer 31 is operated in such a way that circle 124 is above pointer 31 when the airplane is above the glide path and below pointer 31 when the airplane is below the glide path. This is accomplished by moving pointer 31 in response to the glide path signals while circle 124 remains stationary with respect to the indicator face. This operation of pointer 31 is well known to the art and is therefore not here described in detail. As shown in Fig. 2 and Fig. 3, the operation of pointer 31 results in changes in either variable resistance 33 or 34 depending upon the position of pointer 31 and also results in changes in variable resistance 41 or 42 depending upon the position of pointer 31. The effect of increasing the effective resistance of either resistance 33 or resistance 34 will be to decrease the speed of angle of attack selector motor 7, subject, however, to changes in resistances 35 or 36 which are also in the speed control circuit and which are independently varied in response to the action of rate gyros 37 and 38 respectively. These rate gyros operate to increase the resistance at 35 and 36 as the rate of approach of the airplane to the glide path increases. This results in the introduction of another factor to decrease the speed of rotation of motor 7 as the rate of approach of the aircraft to the glide path beam increases.

The direction of rotation of angle of attack selector motor 7 is controlled by the operation of solenoid 49 which in turn operates in response to changes in the total resistance in reversing network 6. As the airplane approaches the glide path from above, the effective resistance of variable resistance 41 becomes less as pointer 31 moves upward. When the airplane approaches the glide path from below, the effective resistance at variable resistance 42 becomes greater as pointer 31 moves downward. By choosing the proper values for resistances 41 and 42, solenoid 49 is made to operate to reverse motor 7 as desired since coil 48 will be sufficiently energized only at total resistance values below a predetermined critical total. On rapid changes of the airplane relative to the glide path an advance reversal of motor 7 is obtained through the action of switches 135 and 140 as described earlier in this specification.

The combined action of speed network 5 and reversing network 6 on reversible motor 7 results in a controlled change in variable resistance 54 when motor 7 is caused to run. This change has the effect of establishing a "requested" angle of attack. This requesting action which is initiated through changes in variable resistance 54 is brought about by the fact that milliammeter 13 is so selected that pointer 59 is centered at a predetermined current value, such for instance as 50 milliamperes, and battery 58, resistance 54 and resistance 57 are so chosen as to produce a 50 milliampere current when movable arms 53 and 56 are approximately at the mid points of resistances 54 and 57. Assuming that needle 59 is centered, any change in resistance 54 will result in an increase or decrease of current from angle of attack network 8 to milliammeter 13, depending on whether resistance is subtracted or added. This will result in a displacement of pointer 59 to the right or to the left. Such displacement can be corrected only by an equal and opposite change in variable resistance 57 so long as the initial change at resistance 54 is maintained. Since changes at resistance 57 are brought about only by changes in the angle of attack of the airplane acting on angle of attack device 11, the net effect of the change made by angle of attack selector motor 7 is to request a new angle of attack for the airplane and this new angle of attack is achieved by adjustments to power control 15 through the action of motor 14 which in turn is controlled by power adjustor 13. However, as the airplane returns toward the glide path the requested angle of attack will change and therefore the action will be to adjust power to match a continually varying requested angle of attack.

During the approach and landing process the attitude or pitch of the airplane is maintained at a predetermined desired angle through the operation of dive control 29. This value may be changed as the airplane proceeds down the glide path but at any one instant of time it is held at a fixed value independently of changes occurring in the angle of attack of the airplane which changes are primarily brought about by changing power input. With the attitude thus fixed, changes in the angle of attack provide an effective means for holding the airplane on the glide path since a sufficiently large increase in angle of attack will bring the airplane back down to the glide path from above and a sufficiently large decrease in angle of attack will bring the airplane back up to the glide path from below. Under this condition of fixed attitude an increase in the angle of attack normally results in a decrease in the rate of ascent and an increase in the rate of descent. Conversely a decrease in the angle of attack normally results in an increase in the rate of ascent and a decrease in the rate of descent. Consequently vertical departures from the glide path are continuously corrected through controlled changes in the angle of attack by means of a continuous automatic adjustment of power output while the attitude is held constant. The ideal condition is one in which the angle of attack is such that the rate of descent of the aircraft corresponds with the rate at which the glide path is descending. It is important to note that the final value selected for attitude will be the attitude of the airplane when contact is made with the runway and the angle of attack for holding the glide path in still air will be the sum of the angle of attitude and the angle of the glide path. It is therefore possible to select a predetermined normal landing attitude, and if this is done the airplane will land on the runway without the necessity of manual control by the pilot and at a speed corresponding to the normal landing speed of the airplane. Direction down the runway will then be maintained by an automatic following of the localizer beam until the airplane has slowed down in its landing run at which point the pilot may take over the controls. It is also possible to select an attitude the angle of which is smaller than the angle of normal landing attitude. This gives a greater air speed for holding the same glide path but this is a desirable feature when the aircraft is well out from the landing field.

Various procedures may be employed in using the present invention as will be apparent to those familiar with the known instrument approach art. I have found that the following procedure is particularly effective. After crossing the field in a direction corresponding to that of the outbound localizer beam at an altitude of about 2000 feet above the field, the aircraft localizer circuit is energized and the plane is therefore caused to hold the outbound localizer beam. At this point the circuit for holding the glide path is not activated but a constant predetermined angle of attack is maintained as a matter of convenience. After following the outbound localizer beam for a predetermined time sufficient to take the airplane a few miles away from the airport, the localizer circuit is disconnected and a 45° turn away from the localizer beam is made. The course away from the beam is held for a short period followed by a 180° turn back to the localizer beam. On approaching the localizer beam, the localizer circuit is again connected which results in an automatic bracketing of the localizer beam on an inbound course at an altitude below that of the glide path. At this point the landing gear and flaps are lowered. The attitude is then set to correspond with landing attitude. When the aircraft approaches the glide path as indicated on the cross pointer indicator, the glide path circuit is energized. The aircraft is then automatically brought to the runway by following the glide path through the action of the above described system. High intensity runway lights may be employed where it is intended that the pilot take over operation of the controls just prior to making contact with the runway.

In making a complete landing using the system of the present invention, the automatic controls are permitted to operate until the aircraft makes contact with the runway and slows down sufficiently in the landing run. This is possible under conditions of little or no wind or where the wind direction is parallel to the runway since the landing track is positioned over the center of the runway and has a relatively gradual descending slope. Where cross wind conditions exist it may be necessary to introduce an additional correction during the last part of the approach in order to avoid landing with excessive drift. Such corrections may be accomplished by correcting the heading just prior to making contact with the ground or by introducing a slip component sufficient to counteract drift. Means for accomplishing this are known to those skilled in the art and therefore need not be described in this specification. As used in this specification and the appended claims the designation "approach and landing system" is intended to comprehend both complete landings as described above and landings in which manual control is taken over by the pilot a short time prior to contact being made with the runway.

In case of prolonged departures of the airplane above the glide path there is a possibility that the actual angle of attack as measured by pointer 9 will reach a point at which the airplane will stall. Other conditions such as reduced power in turns may lead to the same difficulty. In order to make certain that such a condition of stall cannot occur, provision is made for automatically and simultaneously increasing power, stopping the turn and depressing the elevators in the event that the airplane reaches a predetermined critical angle of attack. Each of these correcting actions works to prevent further approach to a stall and is made independently of the other control circuits. For instance, increase of power is accomplished by closing switch 74 and this has the effect of operating motor 14 in a direction to increase power thus tending to decrease angle of attack. As will be seen from Fig. 3 this action is independent of any action at power adjustor 13 which is the normal control for motor 14 but does not occur if the airplane has landed and switch 105 has opened. This feature is necessary since the increase in angle of attack occurring as the airplane slowed down in the landing run would otherwise result in an increase in power. Decrease of turn is accomplished through causing motor 106 to operate when switch 79 closes. The connection to turn control 20 is such that the action of motor 106 overrides any action which would normally be coming from localizer receiver 18. This may be done mechanically by an overriding clutch or electrically by automatically opening the circuit to localizer receiver 18. A part of the action of automatic pilot 21 in stopping the turn is to depress the elevators. In addition to this action in a turn, motor 122 is used to depress the nose if a critical angle of attack is reached when the airplane is in straight flight when switch 79 is closed. The closing of switch 79 is so arranged that it follows in point of time the closing of switch 74. On landing, switch 114 is opened and this disconnects the motor circuits 106 and 122 and thus prevents undesired turn and dive corrections in the landing run which would otherwise result from operation of the emergency circuits.

The system of the present invention as described above operates to maintain the airplane on the glide path automatically. Means are also provided for manually operating power control 15 to hold the airplane on the glide path. As shown in Fig. 2 a manual control 73 for adjusting power is provided. This manual control may consist of the standard throttle controls arranged to operate independently of the effect of motor 14. This may be accomplished by an overriding clutch as is well known in this art. In the process of operating the system manually, the pilot holds the airplane on the glide path by adjusting the throttles through manual control 73 in such a way as to maintain pointer 9 in the same position as pointer 12. Since pointer 9 indicates the actual angle of attack of the airplane and pointer 12 indicates the requested angle of attack set up through the action of motor 7, changes in power required to cause pointer 9 to follow changes in the position of pointer 12 will hold the airplane on the glide path. The pilot merely increases power when the requested angle of attack is less than the actualy angle of attack and decreases power when the requested angle of attack is greater than the actual angle of attack. There is thus provided an emergency procedure in the event of failure of a part of the automatic system.

Having described the use of my invention in carrying out approaches and landings, I will now describe its use as a system for accomplishing automatic flight control. In order to achieve maximnum efficiency in the operation of an airplane, particularly over relatively long distances where the fuel load is continuously decreasing, it is necessary to maintain a constant angle of attack. This may be accomplished by the present invention by manual adjustment of variable resistance 54 through manual control 55 which is mounted in such a way as to override the connection between motor 7 and movable arm 53. With motor 7 disconnected by opening switch 125, a positioning of movable arm 53 through manual control 55 results in the establishment of a requested angle of attack and this requested angle will be indicated by pointer 12 through a suitable mechanical linkage as shown in Fig. 2. Power adjustor 13 and motor 14 will then maintain the necessary amount of power through power control 15 to hold this requested angle of attack regardless of changes in load or attitude. With this angle of attack held constant, the desired altitude may be maintained or changed by making suitable adjustments in control 29 of automatic pilot 21 or by manually operating elevators 25. In either case the change in the position of elevators 25 will not affect the angle of attack which will automatically be maintained at the requested value through adjustments in the power output. However, such changes in the position of elevators 25 will result in a change of attitude which will tend to cause the airplane to gain altitude, to lose altitude or to hold a constant altitude subject to variations due to rising or falling of masses of air. The desired altitude may therefore be maintained by changes in attitude. As is the case of the approach and landing system, the requested angle of attack established for flight control may be maintained automatically or by manual adjustment of the throttles to cause movable pointer 9 to coincide in position with pointer 12.

In describing the present invention specific means have been shown for accomplishing the desired results. It will be understood, however, that other means may be substituted for those shown without departing from the invention.

Thus, a variety of other devices could be used for detecting and responding to changes in angle of attack. Likewise, the reversing network and speed network may be varied and need not be operatively or mechanically connected to the cross pointer indicator as shown in the drawings but could be connected to other means responsive to the glide path receiver. Moreover, electrical circuits may be substituted for the mechanical elements shown without departing from the present invention.

Having thus described my invention, I claim:

1. In a flight control system for aircraft, means for maintaining an airplane at a predetermined attitude, manually adjustable selector means for establishing a value corresponding to a desired angle of attack, detector means for measuring the angle of attack of said airplane, and means responsive both to said detector means and said selector means for varying the power output of said airplane to maintain the angle of attack at the value established by said selector means.

2. In an aircraft approach and landing system for automatically maintaining an airplane on a glide path defined by electromagnetic radiation, means for maintaining the attitude of said airplane at a predetermined angle, selector means responsive to vertical departures of the airplane from said glide path for establishing a value corresponding to an angle of attack for bringing said airplane back to said glide path, detector means responsive to changes in the angle of attack of the airplane for establishing a value corresponding to angle of attack, regulating means for varying the power output of the airplane, and control means responsive both to said selector means and to said detector means for controlling the operation of said regulating means to change the angle of attack of said airplane toward the value determined by said selector means.

3. In an aircraft approach and landing system for maintaining an airplane on a predetermined flight track defined by electromagnetic radiation, means responsive to said flight track and to changes in the angle of attack of said airplane for automatically positioning and maintaining said airplane on said flight track, said means including means responsive to lateral displacements of said airplane from said flight track, means responsive to said lateral displacement means whereby said airplane is laterally maintained on said flight track, selector means responsive to vertical displacements of said airplane from said flight track, angle of attack means responsive to changes in the angle of attack of said airplane, means for maintaining said airplane at a preselected attitude independently of changes in the angle of attack and means for varying the power output and the angle of attack of said airplane in response to the combined action of said selector means and said angle of attack means, whereby said airplane is positioned and maintained on said flight track.

4. In an aircraft approach and landing system for maintaining an airplane on a glide path defined by electromagnetic radiation, receiver means responsive to said glide path, selector means responsive to said receiver means for establishing a requested angle of attack, detector means responsive to changes in the angle of attack of the airplane, regulating means for varying the power output from the power unit of the airplane, and means responsive to the action of said selector means and said detector means for controlling said regulating means whereby the angle of attack of said airplane is caused to vary to correspond with said requested angle of attack.

5. In an aircraft approach and landing system for maintaining an airplane on a glide path defined by electromagnetic radiation, receiver means responsive to said glide path, selector means responsive to said receiver means for establishing a requested angle of attack, detector means responsive to changes in the angle of attack of said airplane, regulating means for varying the power output from the power unit of the airplane, means responsive to the action of said selector means and said detector means for controlling said regulating means whereby the angle of attack of said airplane is caused to vary to correspond with said requested angle of attack, and alarm means responsive to a predetermined critical position of said detector means for automatically increasing the power output from said power unit when said airplane reaches a predetermined critical angle of attack.

6. In an aircraft approach and landing system for maintaining an airplane on a glide path defined by electromagnetic radiation, receiver means responsive to said glide path, selector means responsive to said receiver means for establishing a requested angle of attack, detector means responsive to changes in the angle of attack of the airplane, means for maintaining said airplane at a substantially constant instantaneous attitude, regulating means for varying the power output from the power unit of the airplane, means responsive to action of said selector means and said detector means for controlling said regulating means whereby the angle of attack of said airplane is caused to vary to correspond with said requested angle of attack, and alarm means responsive to a predetermined critical position of said detector means for automatically increasing the power output from said power unit and for automatically changing said attitude when said airplane reaches a critical angle of attack.

7. In an aircraft approach and landing system for maintaining an airplane on a flight track at the intersection of a glide path beam and a localizer beam, the combination of glide path means and localizer means, said glide path means comprising selector means responsive to vertical departures of the airplane from said glide path, detector means responsive to changes in the angle of attack of the airplane, regulating means for varying the power output from the power unit of the airplane, and means for controlling the operation of said regulating means in response to said selector means and said detector means whereby said airplane is maintained on said glide path, and said localizer means comprising receiver means responsive to said localizer beam and automatic pilot means responsive to the output of said receiver means whereby said airplane is maintained on said localizer beam.

8. The invention of claim 2 further characterized by the fact that said selector means includes a speed network for varying the rate of correction of requested angle of attack with the extent of the vertical departure of the airplane from the glide path.

9. The invention of claim 2 further characterized by the fact that said selector means includes a reversing network for changing the direction of requested angle of attack change in the event of rapid vertical movements of the airplane relative to the glide path.

10. The invention of claim 2 further characterized by a balancing network which includes elements operative in response to said selector means and said detector means for balancing said selector values and said detector values against each other and means for operating said regulating means in response to the difference between said values.

11. The invention of claim 2 further characterized by the fact that safety means are included responsive to said detector means for increasing power output at a predetermined critical angle of attack.

12. The invention of claim 2 further characterized by the fact that said regulating means comprise the throttle controls of said airplane.

13. The invention of claim 2 further characterized by the addition of means for deenergizing said control means when said airplane makes contact with the ground.

14. The invention of claim 7 further characterized by turn control means as an element of said automatic pilot means, and means responsive to said detector means for actuating said turn control means at a predetermined critical angle of attack of said airplane whereby a decrease in turn of said airplane is effected.

15. The invention of claim 7 further characterized by dive control means as an element of said automatic pilot means, and means responsive to said detector means for actuating said dive control means at a predetermined critical angle of attack of said airplane whereby the attitude angle of said airplane is reduced.

16. In an aircraft approach and landing system for automatically maintaining an airplane on a glide path defined by electromagnetic radiation, means for maintaining the attitude of said airplane at a predetermined angle, receiver means responsive to said glide path radiation for deriving a signal which varies with departures of the airplane from said glide path, means responsive to changes in the angle of attack of said airplane, means responsive both to said receiver means signal and to said angle of attack means for varying the power output of said airplane and for changing the angle of attack of said airplane to direct said airplane back to said glide path.

EDWIN F. SAXMAN, Jr.

REFERENCES CITED

The following references are of record in the file of this patent:

UNITED STATES PATENTS

| Number | Name | Date |
|---|---|---|
| 2,143,137 | Basim et al. | Jan. 10, 1939 |
| 2,311,642 | Crane et al. | Feb. 23, 1943 |
| 2,410,058 | Frische et al. | Oct. 29, 1946 |
| 2,412,035 | Dornak | Dec. 3, 1946 |
| 2,423,336 | Mosely | July 1, 1947 |